United States Patent [19]

Killinger et al.

[11] Patent Number: 5,769,260

[45] Date of Patent: Jun. 23, 1998

[54] MOLDED PLASTIC STORAGE CONTAINER

[75] Inventors: Timothy D. Killinger, Mayfield Heights, Ohio; Donald A. Malcolm, Roanoke Rapids, N.C.

[73] Assignee: Flambeau Products Corp., Middlefield, Ohio

[21] Appl. No.: 697,210

[22] Filed: Aug. 21, 1996

[51] Int. Cl.[6] .................................................. B25D 51/00
[52] U.S. Cl. .......................... 220/334; 220/4.23; 220/254
[58] Field of Search ................................. 220/4.22, 4.23, 220/254, 334, 675

[56] References Cited

U.S. PATENT DOCUMENTS

| 3,524,564 | 8/1970 | Schurman | 220/334 X |
| 3,667,648 | 6/1972 | Koziol | 220/254 X |
| 3,809,219 | 5/1974 | Esashi | 220/334 X |
| 4,340,139 | 7/1982 | Wilcox, et al. | 220/4.22 X |
| 5,573,132 | 11/1996 | Kanfer et al. | 220/4.23 |

Primary Examiner—Steven M. Pollard
Attorney, Agent, or Firm—Banner & Witcoff, Ltd

[57] ABSTRACT

A molded plastic storage container includes a lower tub section having a hinged front access panel, a detachable, hinged cover and internal dividers adapted to compartmentalize the container.

10 Claims, 6 Drawing Sheets

MOLDED PLASTIC STORAGE CONTAINER

BACKGROUND OF THE INVENTION

This invention relates to a storage container which is especially useful in vehicles, such as sports utility vehicles, mini-vans and the like of the type that include a tailgate and a seat with an area behind and adjacent the tailgate.

Vehicles, such as sports utility vehicles, minivans and the like, include a rear tailgate which opens to permit access to the interior of the vehicle behind the rear seat. The area within the interior of the vehicle behind the rear seat is often used for storage of various items, in lieu of a trunk as associated with standard automobile vehicles. However, storage of materials in the area or region mentioned, may result in items moving about within the vehicle, sliding under seats or otherwise being disbursed within the interior of the vehicle in an undesirable manner.

Thus, there has developed a need for a container which can easily store such materials, will easily fit within the region of the vehicle described, is stable yet removable from the vehicle, and which has a variety of alternative uses. Further, such a storage container should be capable of storage of various items of different size and configuration.

SUMMARY OF THE INVENTION

In a principal aspect, the present invention comprises a molded plastic storage container which may be manufactured by blow molding techniques, for example. The storage container is comprised of a main molded tub or housing with a hinged front access panel. A top closure panel is hinged along one side of the tub or housing. The storage container is adapted to receive internal dividers, which may be adjusted or removed as desired. Additionally, the container includes a removable support platform, which may be supported by the internal dividers. Further, the front access panel is pivotally mounted on one side of the tub so as to form a horizontal table when folded outwardly from the side of the tub or housing. The hinge-top closure panel includes a bracket which supports the top closure panel or cover in the open position. The molded tub has a special configuration with trays molded on opposite sides of the top of the tub container for retaining tools or other items.

Thus, it is an object of the invention to provide an improved molded plastic storage container for use in minivans, sport utility vehicles and for other purposes.

A further object of the invention is to provide a molded plastic storage container which is adapted to receive items of various size and shape and to efficiently retain those items.

Yet another object of the invention is to provide an improved molded plastic storage container which includes internal, vertical dividers and an optional support platform within the container for compartmentalizing the container for purposes of providing segregated storage compartments.

Another object of the invention is to provide a molded plastic storage container which may utilize bungee cords for attaching items and holding items within the container.

Another object of the invention is to provide a molded plastic storage container with a front access door or panel that may also be utilized as a horizontal table or support platform.

Another object of the invention is to provide a molded plastic storage container which includes a cover and latches to tightly hold the container in a closed position and which also permits attachment of a padlock thereto for increased security.

Another object of the invention is to provide a molded plastic storage container with integrally molded handles for easy removal and transportation of the storage container.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
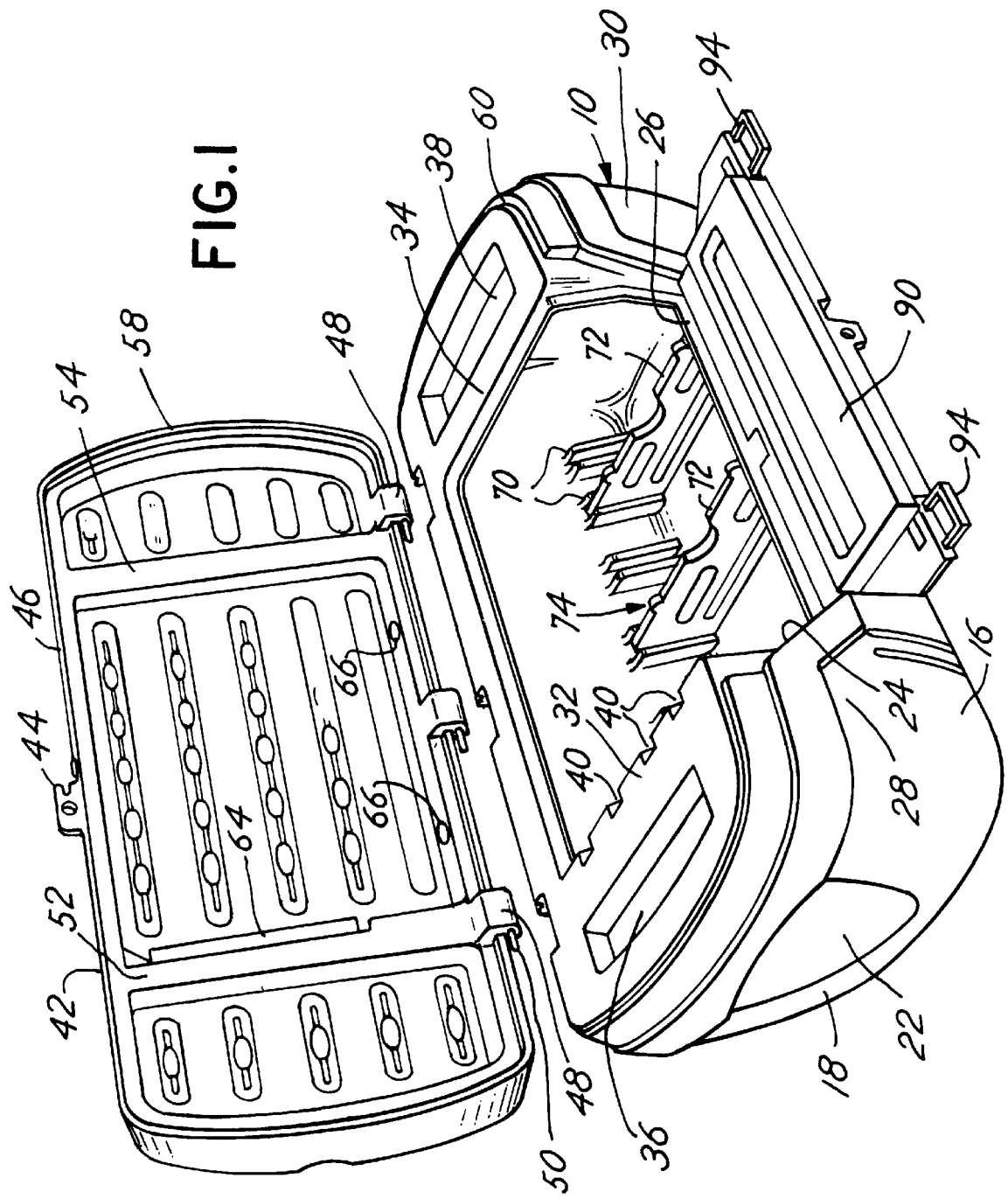
FIG. 1 is an isometric view of the storage container of the invention in the open position.
Figure 2:
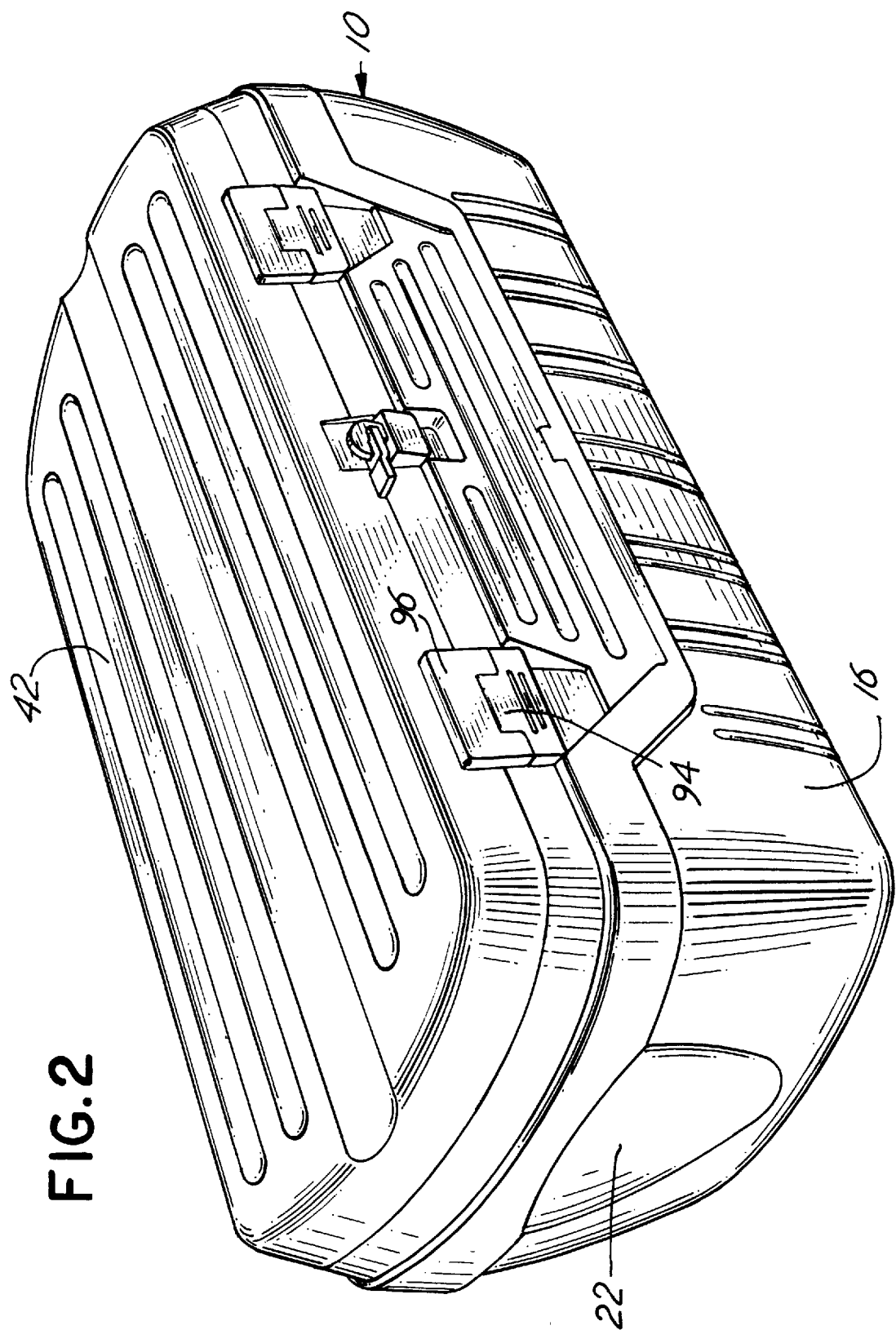
FIG. 2 is an isometric view of the storage container of the invention in the closed position.
Figure 3:
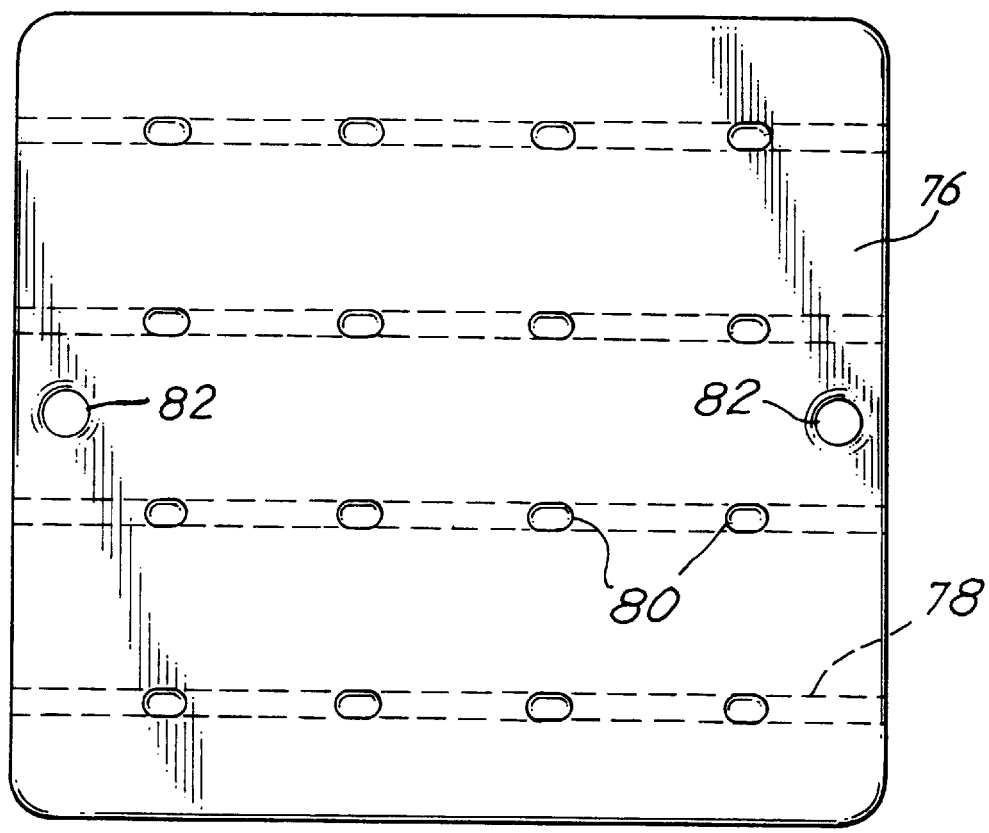
FIG. 3 is a plan view of the underside of the floor panel or subfloor of the storage container of the invention.
Figure 4:
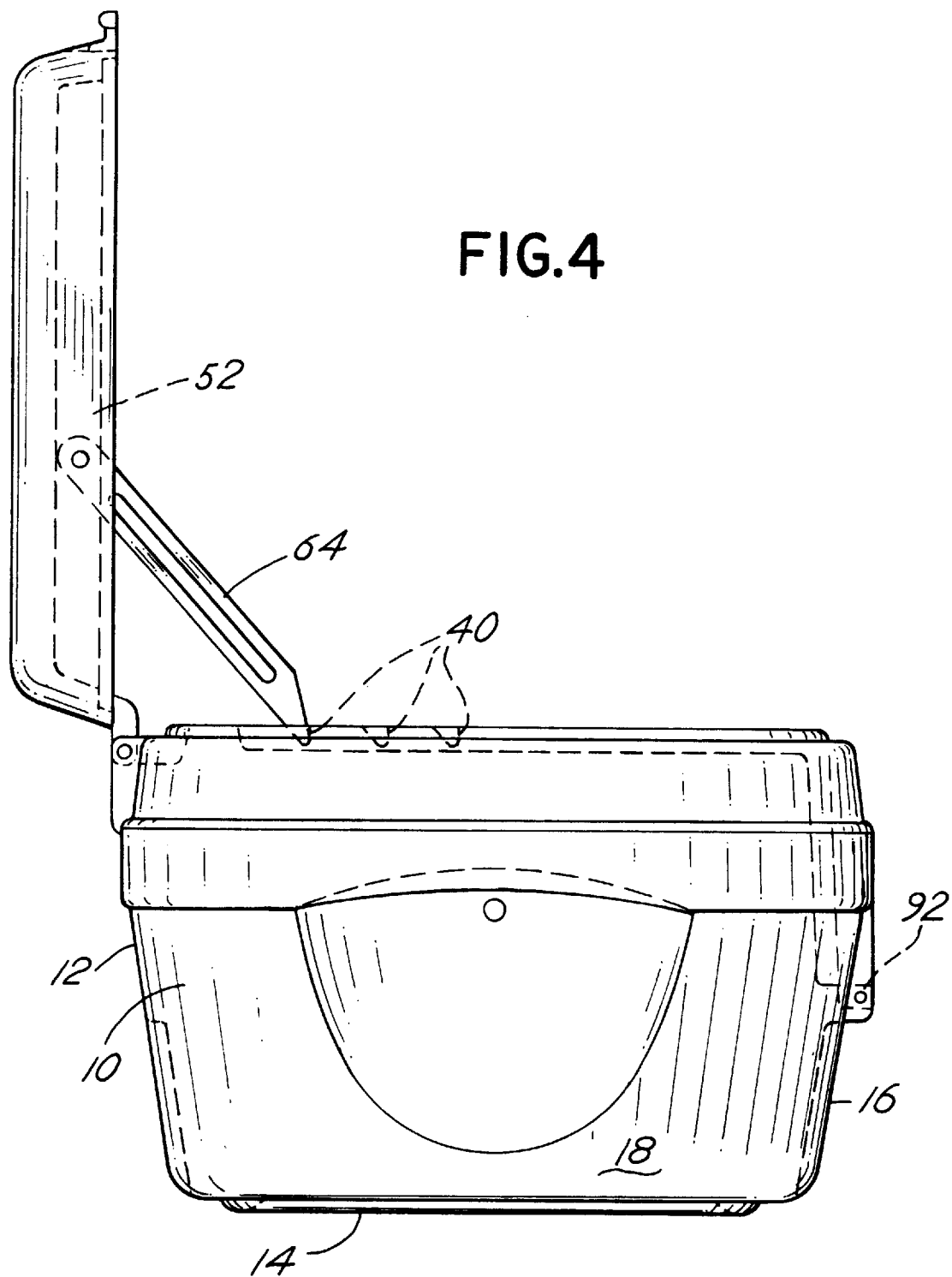
FIG. 4 is a side elevation of the storage container of the invention with the top panel or cover in the open position.
Figure 5:
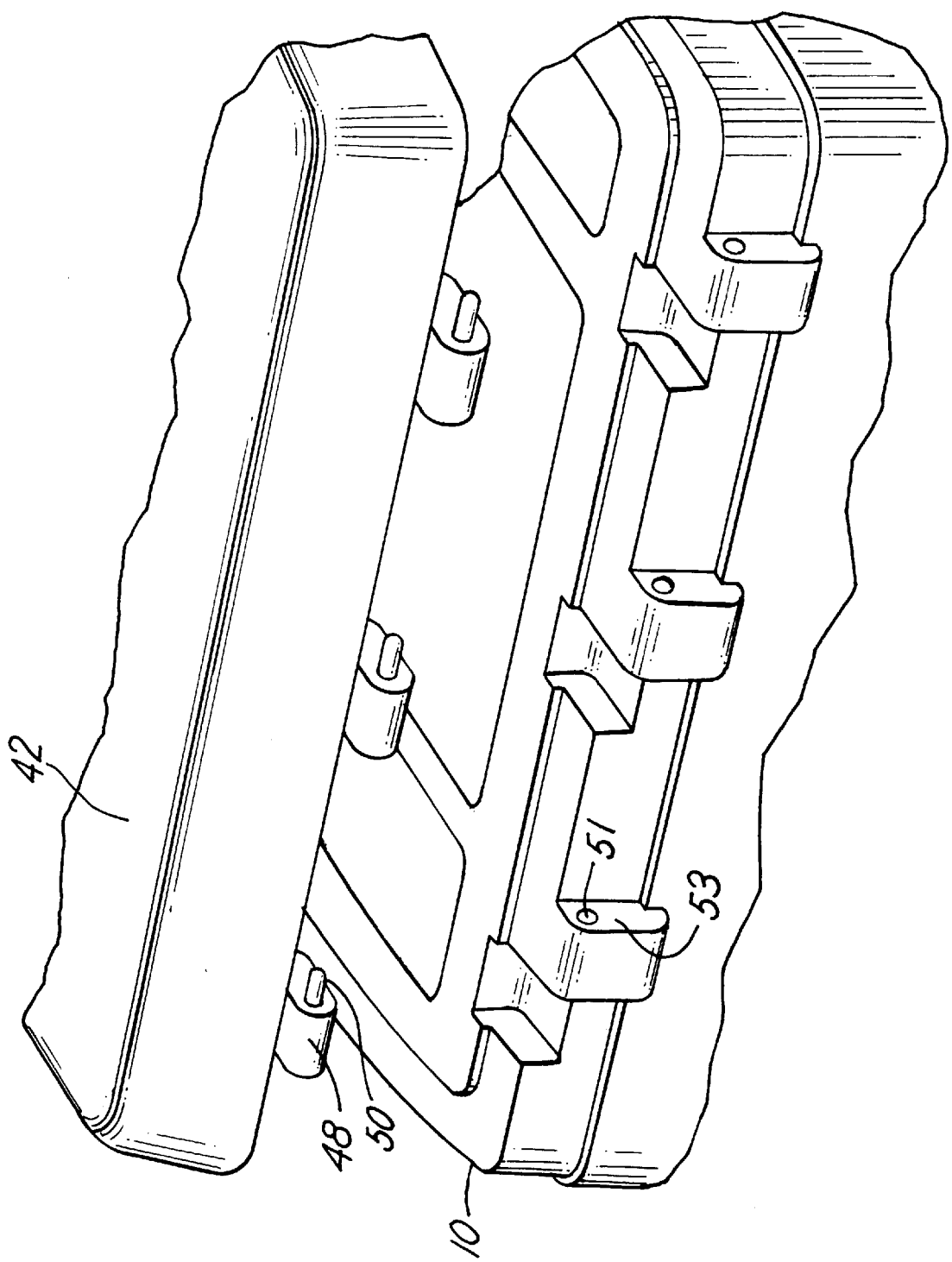
FIG. 5 is an enlarged, exploded isometric view of the cover hinge construction of the storage container.
Figure 6:
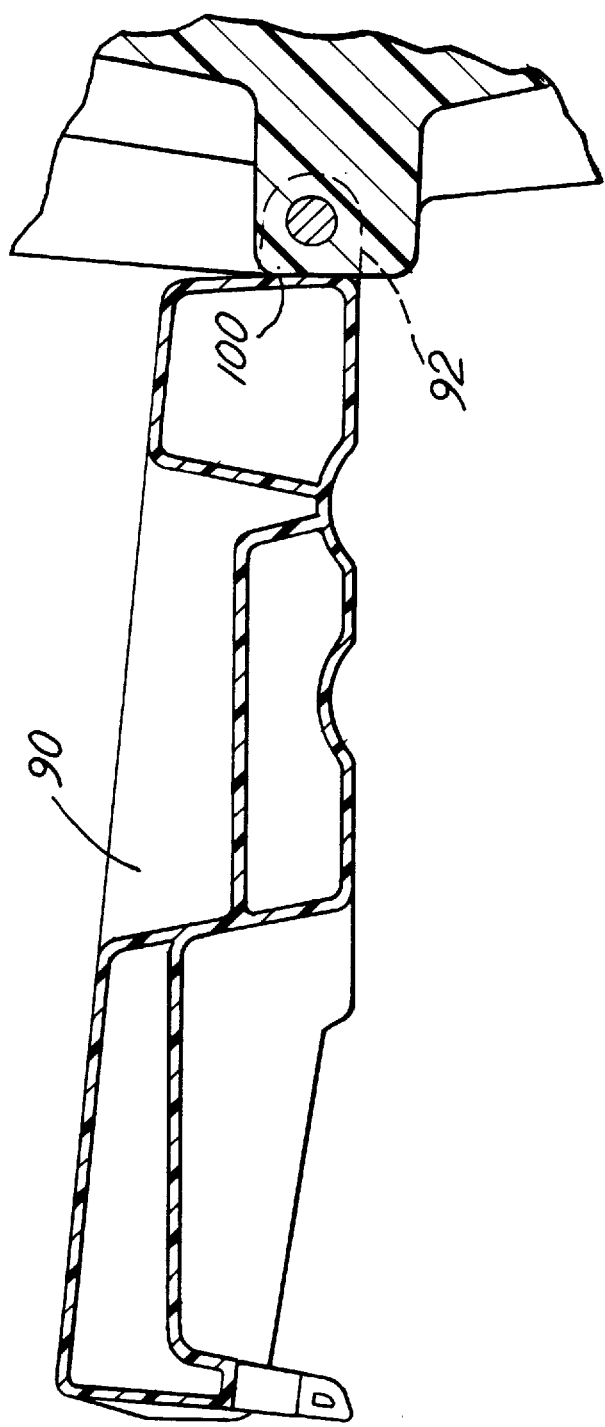
FIG. 6 is a partial sectional view of the arrangement of the front access panel of the invention in the open position illustrating the manner by which the front access panel is supported in a horizontal position.

Referring to the figures, the container of the invention is comprised of a number of molded plastic component parts which may typically be manufactured by blow molding techniques and assembled to define the total container. Thus the container includes a tub or housing 10 having a back wall or back side 12 which rises generally vertically from a floor or bottom 14. A front side 16 also rises from the bottom 14. The front side 16 and back side 12 are connected by ends or end sides 18 and 20. The front side 16 and back side 12 are generally opposed and parallel as are the end sides 18 and 20. Handles, such as handle 22, are integrally molded into the outside surface of the end sides 18 and 20. The sides 12, 16, 18 and 20 thus define an enclosure. The bottom side or bottom 14 is, of course, generally flat or planer so as to support the container.

The front side 16 includes a molded recess opening 24 which is defined by a horizontal ledge 26 having a height from the bottom 14 which is less than the height of the end sides 18 and 20 and back side 12. Also, a section or portion of the front side 16 has a uniform wall height which is equal to the wall height of the back side 12. Thus, front side 16 includes separated sections or portions 28 and 30 which have a uniform height relative to the back side 12. The region or portions of the sides 12, 16, 18 and 20, which are of uniform height, are joined or connected by a tray 32 at end side 18 and tray 34 at the opposite end side 20. The tray 32 includes a recessed section 36. The tray 34 also includes a recessed section 38. Materials may thus be stored in either recessed section 36, 38. Note that each recessed section 36 and 38 is generally rectangular in shape and surrounded on all sides by the planer top of the trays 32 and 34. The tray 32 further includes notches or detents 40 which are cooperative with a prop rod or bracket or brace associated with a cover panel as described below.

A cover panel 42 has an outline or shape which is generally congruent with the outline in plan view of the housing or tub 10 and is also manufactured by a plastic molding technique. The cover or cover panel 42 is thus generally rectangular in shape. It includes a projecting tab 44 along a front edge 46 for receipt of a latch or padlock. The cover or panel 42 further includes hinge lugs 48 which include projecting hinge pins 50. On the inside of the cover 42, are molded cross members or bar 52 and 54 which, when the cover 42 is closed, fit over the edge of a tray 32 or 34 so as to enclose materials within the recesses 36 and 38 of the respective trays 32, 34 so as to retain the items in the compartment defined thereby.

The cover 42 includes a peripheral rim 58 which is shaped to engage or fit onto a lip or ledge 60 extended about the circumference of the tub 10. This provides for a seal which prevents undesired dirt, for example, to enter the enclosed tub 10. The inside of the cover 42 is thus recessed. A hinged bracket or brace 64 is attached to the bar 52 and cooperates with the notches 40 in tray 32 to support the cover 42 in the open position. Notches 66 are defined on the inside of the cover 42 and receive the gripping end of a bungee cord, for example, to hold materials tightly in place against the cover 42, again as illustrated in the figures.

Within the interior of the housing 10 are defined a series of opposed pairs of vertically parallel, integrally molded channels or slots 70 designed to receive vertical dividers 72 so as to compartmentalize the interior of the housing or tub 10. Each divider 72 is a molded plastic member. Each divider 72 preferably includes a vertical projection 74 projecting upwardly from the top of the divider 72. A planar subfloor 76 may be fitted onto the dividers 72. Subfloor 76 is removable. Planar subfloor 76 includes notches 78 on one side and detent openings 80 on the opposite side which cooperate with the projecting elements 74. When the detent openings 80 are positioned to engage the subfloor 76, the floor is generally non-slidable in any direction. When the notches 78 are engaged, the subfloor 76 may slide from side to side for access to compartments defined by the dividers 72. Finger holes 82 are also provided in the subfloor 76. The subfloor 76 is sized so as to have a front to back dimension substantially equal to the distance between the front side 16 and backside 12. The lateral dimension of the subfloor 76 is such that it will fit within the opening 24 in front side 16 between the sections 28 and 30 and can slide from side to side between the end sides 18 and 20.

A front panel 90 is attached by a hinge 92 in the access opening 24 and is sized so as to essentially completely enclose the firont side of the housing of tub 10 when the panel 90 is in the closed position. The panel 90 is pivoted to the position illustrated in FIG. 1 so as to permit access to the contents of the container, even when the top cover 42 is in the closed position. Spaced latches 94 are attached to the access panel 22 and cooperate with latching elements 96 molded into the cover 42 so as to hold the container in closed position. A tab 98 is defined in the access panel 90 for cooperative action with the tab 44 and the cover 42. The hinges 92 include stops or blocks 100 so that the panel 90 when moved to the open position will be retained in a generally horizontal position so as to serve as a table or support when the panel 90 is open.

The hinge lugs 48 associated with the cover 42 are adapted to fit and slide on the rim 60 to guide hinge pin 50 into pin openings 51 defined in lugs 53 molded in the backside 14 of the tub or housing 10. In this manner, the lugs 48 may be properly aligned on the rim 60 and then guided by sliding movement into the lugs 53. Thus, the cover 42 is removable from the assembly and may be detached and used, for example, as a tabletop, separate and apart from the container. The prop rod or base 64 holds the lid 42 or cover 42 in an open position when the cover 42 is attached to the housing or tub 10.

Various alternative features and elements may be utilized in the combination and the subject matter of the invention may be changed or altered. Therefore, the invention is to be limited only by the following claims and their equivalents.

What is claimed is:

1. A plastic storage container comprising, in combination:

a generally four-sided, molded tub having a bottom, a front side, a back side, opposite end sides connecting the front and back sides, said back side and opposite end sides all having substantially the same uniform height and a portion of the front side also having the same uniform height, the remainder of the front side being shorter in height to define a front access opening to the tub, said front, end and back sides of uniform height being connected by an integrally molded end tray at the opposite ends of the tub;

a hinged top closure panel fitted over the sides of the tub to close the top opening formed thereby and fitting over the end trays to simultaneously close the trays, said top panel including latch members, said top panel hinged to the back side of the tub; and a front panel hinged to the front access opening and coincident with said access opening, said panel pivotal to enclose the container when the top closure panel is in the closed position and including latching members cooperative with the top panel latching members to retain the container parts in closed position.

2. The container of claim 1 wherein the top panel is removably hinged to the back side of the tub and including a top panel support bracket extending from the top panel into a slot defined in one tray to hold the top panel open.

3. The container of claim 1 wherein the tub includes a plurality of internal vertical dividers removably fitted into molded vertical channels on the inside of the tub.

4. The container of claim 3 wherein the dividers define a support plane, and including a removable subfloor supported by dividers in the tub.

5. The container of claim 4 wherein the dividers include spaced vertical projections projecting into the detents in the subfloor to retain the subfloor.

6. The container of claim 4 wherein the dividers include spaced vertical projections projecting into grooves in the subfloor to permit sliding movement of the subfloor in one direction in the tub.

7. The container of claim 1 wherein the trays molded at the end of the tub include a recessed tray section.

8. The container of claim 1 wherein the top closure includes an inside surface with a pattern of molded notches capable of receiving and engaging a bungee fastener.

9. The container of claim 1 wherein the front panel includes molded stops for supporting the panel in a horizontal position when open to define a platform.

10. The container of claim 1 wherein the back side includes a ledge with a series of hinge pin lugs projecting upwardly therefrom, said lugs each including a hinge pin opening, and wherein the top closure panel includes a matching series of hinge pin lugs, each with a projecting hinge pin for engagement with the hinge pin opening by sliding movement with said hinge pin lugs when supported by the ledge to facilitate attachment of the pins into the hinge pin openings.

* * * * *